Jan. 16, 1968 R. F. VILLALOBOS 3,363,371
ERECTION OF PREFABRICATED HOUSES
Filed Jan. 7, 1965 6 Sheets-Sheet 1

INVENTOR
ROBERTO FAJARDO VILLALOBOS

BY
ATTORNEYS

Jan. 16, 1968  R. F. VILLALOBOS  3,363,371
ERECTION OF PREFABRICATED HOUSES
Filed Jan. 7, 1965  6 Sheets-Sheet 3

INVENTOR
ROBERTO FAJARDO VILLALOBOS

BY *Jminie and Smiley*
ATTORNEYS

Jan. 16, 1968   R. F. VILLALOBOS   3,363,371
ERECTION OF PREFABRICATED HOUSES
Filed Jan. 7, 1965   6 Sheets-Sheet 5

INVENTOR
ROBERTO FAJARDO VILLALOBOS

BY
ATTORNEYS

Jan. 16, 1968    R. F. VILLALOBOS    3,363,371
ERECTION OF PREFABRICATED HOUSES
Filed Jan. 7, 1965    6 Sheets-Sheet 6

Fig. 17.

INVENTOR
ROBERTO FAJARDO VILLALOBOS

BY
ATTORNEYS

United States Patent Office 3,363,371
Patented Jan. 16, 1968

3,363,371
ERECTION OF PREFABRICATED HOUSES
Roberto Fajardo Villalobos, Av. Baja California
245-106, Mexico City, Mexico
Filed Jan. 7, 1965, Ser. No. 423,980
Claims priority, application Mexico, Jan. 10, 1964, 75,344;
Aug. 20, 1964, 78,585
8 Claims. (Cl. 52—90)

ABSTRACT OF THE DISCLOSURE

A building panel including a rectangular frame comprising a pair each of longitudinal and transverse structural members locked together by tabs on the ends of one said pair of members and extending through and locked in slits in the end portions of said other pair of members, a plurality of reinforcing members secured within said frame by tabs at the ends of said members extending through and locked in slits in the frame members, a layer of water proofing material on at least two faces of said frame, a layer of metallic mesh material on each layer of water proofing material, a plurality of pairs of punched anchoring tongues extending through said layers with the tongues of each pair locked together to hold said layers in position, and a plurality of assembling tongues on the edges of the panel for locking engagement with corresponding pluralities of tongues on adjacent panels.

The panels can be arranged side by side to form the walls and roof of a building, supported on a foundation formed by a plurality of brick stacks, a plurality of metal rings and a concrete floor slab embedding the brick stacks, the metal rings and the metal rods. A concrete skin is adhered to at least the outer metal mesh layer of said assembled panels.

---

The present invention refers to an improved system for the erection of prefabricated houses, by using separate elements or modules which are joined together to erect the entire building, and more particularly, it is related to a system for the erection of prefabricated houses, using modular sections which are of a very light weight and which are connectable by very simple means.

Hereinbefore, in the building industry, and more specifically in the erection of prefabricated houses using separate unitary sections, the frame members used to build said sections or modules had to be fabricated in bending machines and by means of special drills, thereby rendering the manufacture of the houses very costly. In using this type of modules or prefabricated sections, it was necessary to produce special members which constituted a drawback in the mass production of modules, adding to the cost thereof.

On the other hand, the different types or forms of structural profiles produced, in order to fabricate the frames of the sections or modules, could not be used for joining or assembling roofs and walls by using the hooking system by means of manual or automatic machines, and as this was the most economical and fast system for this type of joints, it was evident that the building industry had to look for an improved system for erecting houses by using separate and prefabricated sections or modules, of a structure and nature such that they could be suitable for being joined together by means of the simple hooking or turning-over of the edges by machines, and of an appearance which could be considered similar to any concrete wall or roof, as well as of a very light weight.

Also, in the building industry, where sections or separate modules were used, formed by metallic profiles to form the frames thereof, which thereafter were covered by means of a metal screen to provide for spraying thereon a concrete base material, the drawback was always present of rendering it impossible to avoid partial entrance of the sprayed concrete material into the otherwise empty chamber of the module or section, when the coating of this material was applied by means of pneumatic guns, inasmuch as the concrete, being a semifluid material, tends to penetrate the steel screen, thereby partially nullifying the objective of this air chamber, that is, to provide thermal and acoustical insulation to the building, and also a remarkably small weight, with strengths equivalent to those achieved by using cast concrete walls and roofs.

In this field of science hereinbefore it was necessary to prefabricate the modules or sections entirely in a plant mounted for that purpose, and to then transport said units which, regardless of the smaller weight as compared to cast concrete, are still heavy enough to cause trouble in the handling of materials and in the assembly at the proper place in which the house is going to be erected.

In the system for erecting a prefabricated house, by using modules or sections of different types, there had always been the problem that the joints between the different members of the individual modules, and between the modules themselves, had to be performed by welding the edges thereof together, or by providing special members to be welded together, in order to assemble several modules to form for instance, a wall or a roof, and this system, while very effective, has the disadvantage that the time and labor absorbed are rather high, so that it has always been the purpose of the builders to find a new method of assembly by means of simpler means than welding. While welded joints completely meet the economy requirements for the construction and for the efficiency and strength in order to obtain a good performance thereof, these joints also present the disadvantage that, as the modules used in this present invention has to be completely surrounded by a metal screen, additional members have to be provided in order to make it possible to weld the several members therebetween.

While the welding of the joints does not constitute a serious drawback, it implies an operation which of course adds to the cost of the building inasmuch as the welding of the joints requires of a specialized operator, which has to earn a relatively high salary, and the time used for assembling the several modules is also considerable, which also adds to the cost and detracts from the economy looked for in this type of constructions.

According to the present invention, a new system of erecting prefabricated houses is provided, wherein individual modules or sections are built by means of simple members of structural tubular material, which can be joined by welded or hooked joints and which are also provided with means to join one module to the adjacent modules in the construction, in order to erect the house in a very simple manner and without having resource to any complicated equipment or to specialized and highly trained personnel.

Accordingly, it is an object of the present invention to provide an improved system for erecting prefabricated houses by using sections or modules, in which fabricated modules are provided having an extraordinarily small weight, comprising merely a commercial profile metal structure to build the strength member or frame, and which will be lined by means of a metal screen and provide great advantages in the handling of the material and in the assembly of the units in its place.

Another object of the present invention is to provide an improved system of the above mentioned character, wherein the sections or modules are thereafter coated by means of a water-proofing material in order to apply thereon as a final step a uniform spray of adequately compounded concrete, which will not penetrate the metal screen, by reason of the latter being covered by said water-proofing material.

Another object of the present invention is to provide an improved system for erecting prefabricated houses, which provides for the builder the great advantage of not needing to first build the foundation, the foundation course and the floor slab, inasmuch as these operations are effected after the assembly of the walls by means of the above mentioned prefabricated sections or modules has been effected.

Another object of the present invention is to provide an improved system for erecting prefabricated houses, of the above mentioned character, in which a very simple and economical construction operation is effected, as well as an expeditious transportation of materials, avoiding troubles because of excessive weight of the units, and providing a finish in the building which is similar to the finish obtained in a house which is erected by conventional means.

Another and more specific object of the present invention is to provide an improved system for the erection of prefabricated houses using modules, which will avoid the welding operation in the assembly of several individual modules, thereby rendering the construction operation much more economical and fast than hereinbefore.

Another object of the present invention is to provide an improved module for the erection of houses, having all the members thereof joined by means of tabs which are folded over after passing through the walls of other members, to thereby provide a sufficiently rigid joint so that the frame of said modules, reinforced by means of suitable cross members, will perform as an assembly which is completely unalterable and which will serve as a construction supporting element.

Another and more particular object of the present invention is to provide a module specially adapted to be used in the construction of roofs, which will also incorporate the joint system between the different members by means of the assembly of tabs and openings, such as above mentioned, and which will be provided with suitable means to fasten the reinforcement rods which in the prior art had to be welded to each module in order to perform their job.

An additional object of the present invention is to provide a simplified system for the individual assembly of the frames of the modules used for the erection of prefabricated houses, such that the transportation of the structural members will be easier, as these members can be assembled to form the modules in the field, thereby avoiding the use of the otherwise considerable space involved in the transportation of the already assembled individual modules which hereinbefore had to be sent directly from the factory and which, by means of the system of the present invention can be sent unassembled in order to be assembled in the field.

Other and additional objects and advantages of the present invention will become apparent to anyone skilled in the art, while still others will appear in the following disclosure of preferred embodiments of the present invention, taken in connection with the accompanying drawings, wherein:

Having now more particular reference to the drawings and specially to FIGS. 1 through 4 thereof, a module built in accordance with the present invention is shown which module is specially adapted to be used in the erection of walls by assembling together several of these modules in a side by side relationship in sufficient number to obtain a predetermined length of the wall.

The wall module according to the present invention is comprised by a pair of vertical structural members 11 and a pair of horizontal structural members 10 which according to the drawings accompanying the present specification are joined together by means of assembling tongues 13 which are arranged through corresponding openings in the other member and which are thereafter folded over by means of a manual or mechanical hammer or any other suitable tool in order to provide a strong stiff joint therebetween. The structural members 10 and 11 preferably are of channel section as shown.

Figures 1, 2, 3, 4:
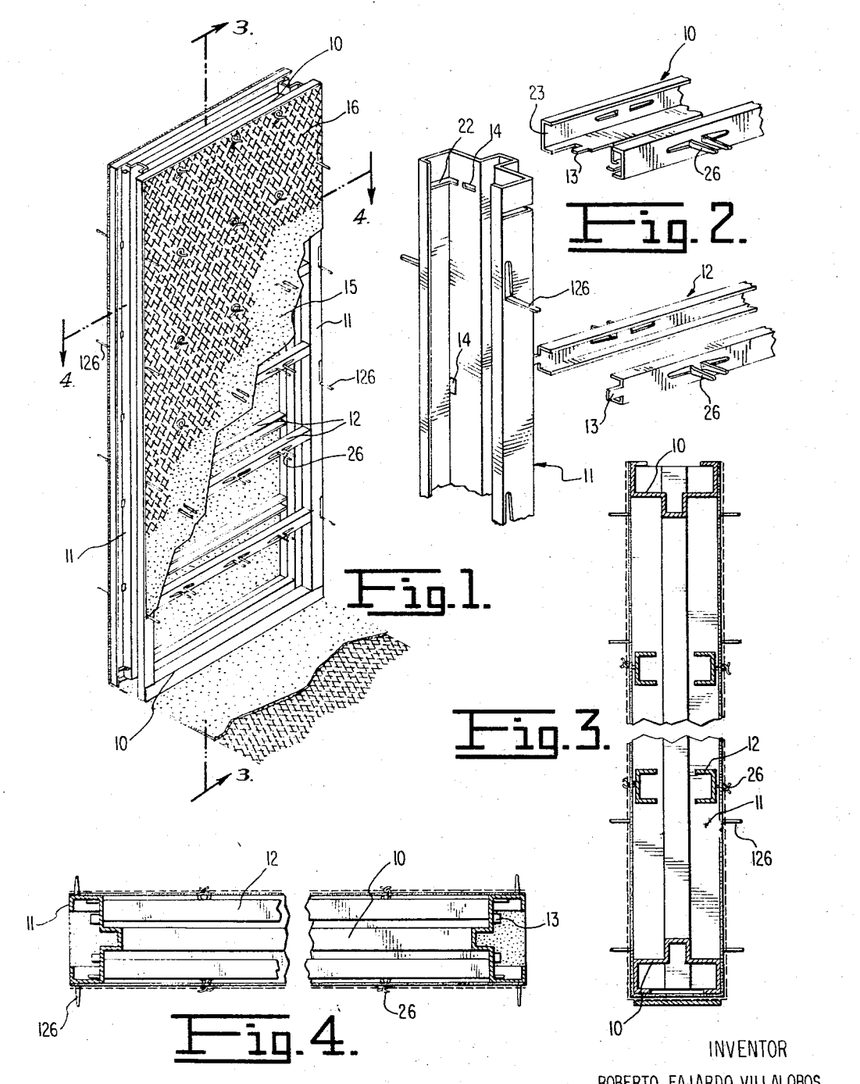
FIG. 1 is a perspective partially cut-away view of a section or module built in accordance with the teachings of the present invention and suitable for being used to erect a wall.
FIG. 2 is a fragmentary perspective view of the three types of different members used to build the module shown in FIG. 1.
FIG. 3 is a cross-sectional elevational view of the module shown in the above figures, along lines 3—3 of FIG. 1.
FIG. 4 is a cross-sectional view of the wall module taken along lines 4—4 of FIG. 1.
Figures 5, 6, 7, 8:
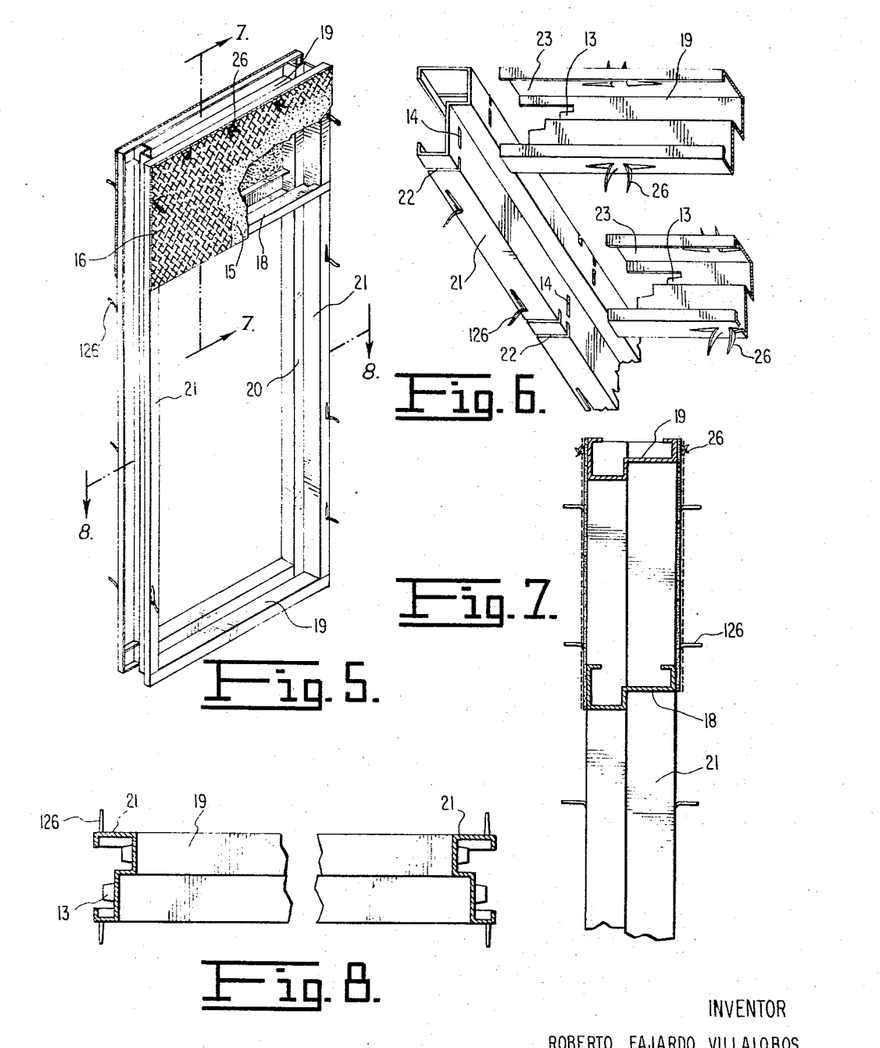
FIG. 5 is a perspective partially cut-away view of a section or module built in accordance with the present invention and suitable for being used to erect a door member of a wall.
FIG. 6 is a fragmentary perspective view of the different members used to build the module of FIG. 5.
FIG. 7 is a fragmentary elevational cross-sectional view of the module of FIG. 5, taken along lines 7—7 thereof.
FIG. 8 is a cross-sectional view of the module of FIG. 5, taken along lines 8—8 thereof.

As clearly shown, the module illustrated in FIG. 1 comprises a frame formed by members 10 and 11 assembled as above described, by means of the assembling tongues or tabs 13 provided at the ends of members 10 which pass through the openings 14 in the end walls provided adjacent the ends of members 11. Also, members 11 are provided with additional openings or slits 22 which run through the side flanges or side walls of the members 11, these slits 22 serving to receive corresponding projections 23 of the side flanges of horizontal members 10 which ends are under cut to provide the assembling tabs 13 at the bottom of the bight of the above mentioned under cut. The above type of joint will provide a completely rigid frame structure which will be self supporting and which will be able to perform as a load member in the erection of the prefabricated house.

The wall module of the present invention is reinforced by means of a plurality of cross members or struts 12 attached at both ends thereof, also by means of assembling tabs 13 into the two vertical members 11 such that the longitudinal edges of the cross members lay flush with the longitudinal edges of the frame members 10 and 11 as shown in FIGS. 3 and 4 of the drawings, leaving, if desired, a small gap therebetween to accommodate the folding and twisting over of the anchoring tongues 26 as will be described more fully hereinafter.

The module of the present invention is provided with the above mentioned plurality of cross members at different predetermined heights of the side vertical members 11 as shown to obtain a completely rigid frame to be used as a load-carrying member. The anchoring tongues 26 are struck out from the sheet material which is used to build the structural members of the present invention and in order to form the complete module these anchoring tongues 26 are folded out at an angle of about 90° to the remainder of the surface of the member in order to arrange them in a position as shown in FIGS. 1 and 2.

After building the complete frame with the anchoring tongues in the above mentioned position, the module of the present invention is completely lined with a sheet of waterproofing material 15 which is penetrated by the tongues 26 whereby these tongues provide a fastening device for the above mentioned lining 15. The waterproofing material is thereafter completely covered by means of a metal mesh or screen 16 upon which the anchoring tongues are twisted over in pairs in order to tightly fasten both layers around the module, thereby providing a hollow or empty chamber which provides the modules of the present invention with the remarkable lightweight characteristic desired.

Figure 15:
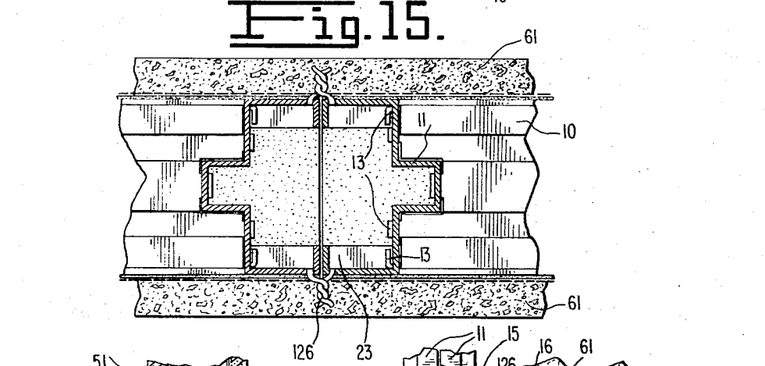
FIG. 15 is a fragmentary cross-sectional view of the joint between two modules according to one embodiment of the invention showing the anchoring and assembling tongues in the anchoring and assembling position.

Other of these anchoring tongues, designated by the number 126 are provided adjacent the edges of the frame members 10 and 11 to act as module assembling tongues as shown in FIG. 15 of the drawings. For this purpose, after placing a pair of modules in side by side relationship, the assembling tongues 126 are twisted over those of the other module in order to fasten them together.

After assembling the number of modules desired to form the wall, a concrete material of suitable consistency is applied all over the surfaces of the modules thereby forming a monolithic layer of concrete which is duly anchored by the twisted anchoring and assembling tongues 26 and 126, as clearly shown in the fragmentary view of FIG. 15.

As shown in FIGS. 5 through 8 of the drawings, another type of module which can be built in accordance with the teachings of the present invention is one to contain a door so that a frame for accommodating the above mentioned door is provided at the lower portion thereof, this section being uncovered by the layers 15 and 16 which are only provided over the lintel of the door.

Anchoring tongues 26 are also provided on the structural members only on the sections corresponding to the door-head to fasten the layers 15 and 16, as described in connection with FIGS. 1 through 4, and assembling tongues 126 are provided also on the door frame to assemble this door module with adjacent wall or window modules as shown in FIG. 15 of the drawings.

Of course that in the present case different types of structural members 21, 18 and 19 are used to form the module, because it is necessary to provide a shoulder 20 to accommodate and stop the door in its closed position. The different structural members are also assembled to form the door frame which otherwise is similar in construction to the wall module shown in FIGS. 1 through 4.

Figure 14:
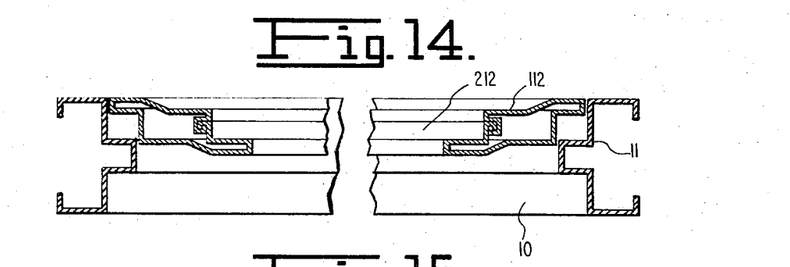
FIG. 14 is a cross-sectional view of a module built in accordance with the present invention to be used in a wall, showing a window frame about to be assembled into said module.

The wall modules of the present invention can be provided, if desired, with a window frame between a pair of the cross members 12, this window frame accommodating a window sash 112 formed of winged structural material as shown in FIG. 14, in order to snugly fit into the window frame, one of the wings of the window sash abutting with a central longitudinal projection provided centrally along the facing side of members 11, the other wing of said window sash acting as a stop for the window glass 212 which is conventionally fastened thereto by means of any type of plastering material.

Figure 9:
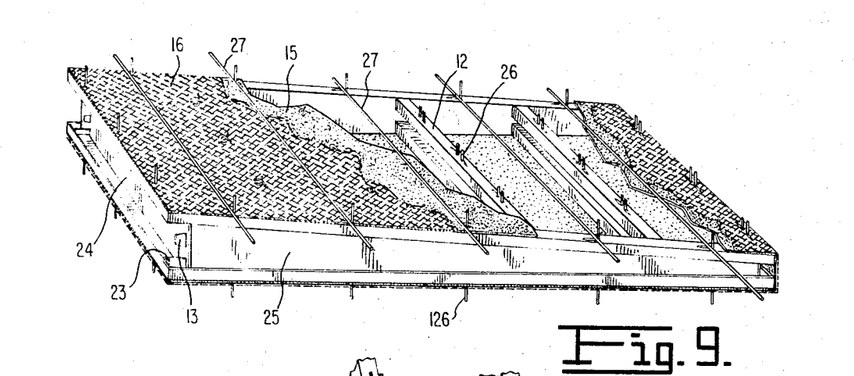
FIG. 9 is a perspective partially cut-away view of a section or module built in accordance with the teachings of the present invention and suitable for being used to build roofs.
Figure 10:
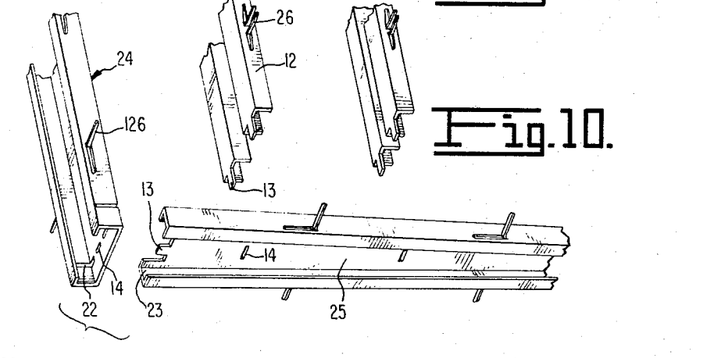
FIG. 10 is a fragmentary perspective view of the different members used to build the module of FIG. 9.
Figure 11:
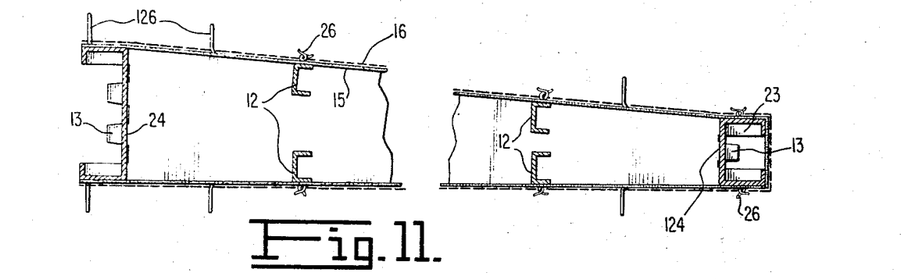
FIG. 11 is an elevational fragmentary cross-sectional view of the module of FIG. 9.

FIGS. 9 through 11 show another type of module built in accordance with the present invention to build a roof or ceiling. This module comprises a pair of triangular or trapezoidal longitudinal members 25 which are provided at the ends thereof with assembling tabs 13 and projections 23 to engage corresponding slits 14 and 22 of a transverse wide member 24 and of a transverse narrow member 124.

Figure 17:
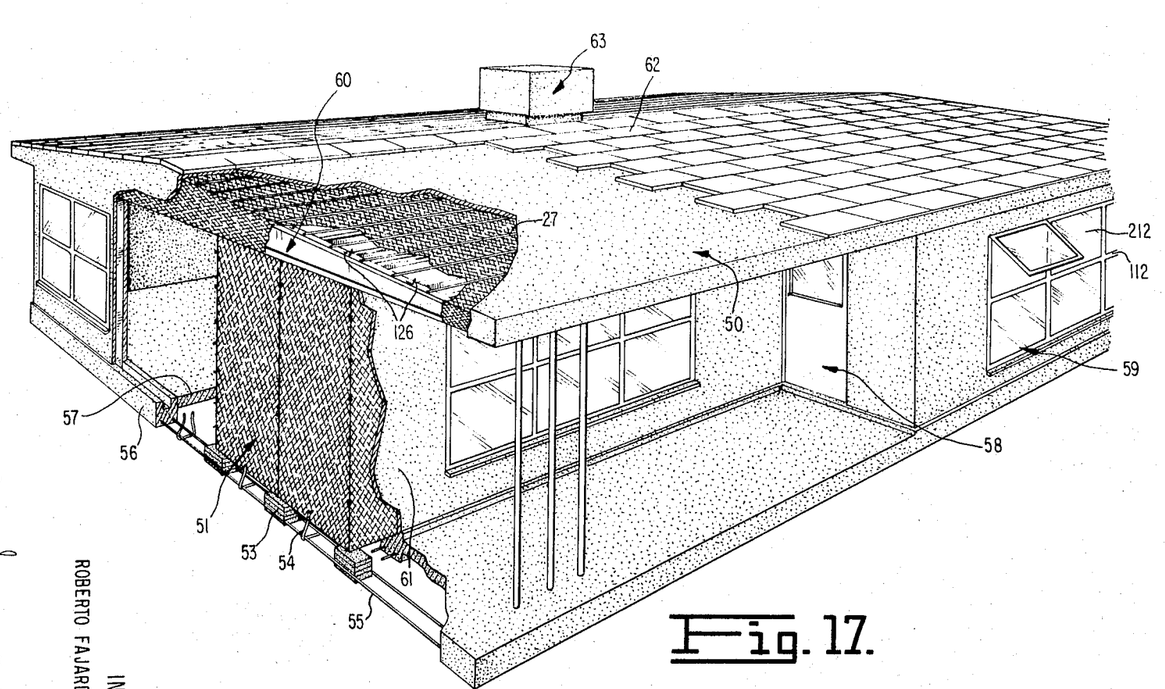
FIG. 17 is a perspective partially cut-away view of a house built in accordance with the teachings of the present invention.

In this case, also a plurality of cross members 12 are provided having the above described pairs of anchoring tongues 26 and a plurality of assembling tongues 126 which in this particular case are also used to fasten the reinforcing rods 27 provided to reinforce the concrete layer which will serve as the roof slab 50 as shown in FIG. 17 of the drawings. Otherwise, the roof module of the present invention is of a similar construction to the module shown and described in connection with FIGS. 1 through 4.

Figure 16:
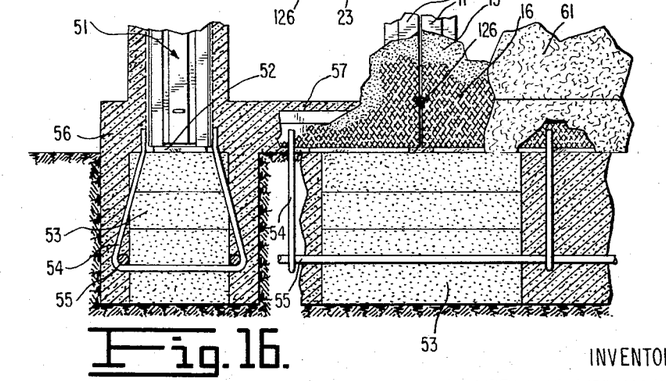
FIG. 16 is a fragmentary cross-sectional elevational view of the foundations and floor slab built in accordance with the present invention.

As shown in FIGS. 16 and 17 of the drawings, the modules of the present invention, designated by the reference character 51, are seated by means of welded or anchored steel plates 52, on a foundation formed by a plurality of bricks 53 arranged in stacks uniformly spaced such that they coincide with the corners of the modules, and steel loops 54 are provided in positions intermediate said brick stacks through which a pair of steel rods 55 is threaded as shown, said pair of steel rods being tightly held in position by the side surfaces of the brick stacks 53 and the corner of the steel loops 54 to serve as reinforcement for the floor slab 56 monolithically cast into the foundation well and together with the surfacing of the walls, floor and ceiling.

FIG. 17 shows a complete building built in accordance with the present invention, the sectioning in this building showing the different elements from which it is formed, namely, foundation 56, floor slab 57, wall panels or modules 51, door panels 58, window panels 59, roof panels 60, roof covering 50 of concrete material, wall covering 61 of concrete material, surfacing panels 62 for the roof, and a chimney 63.

It is preferred, though not necessary, to build a house by first arranging in proper positions the brick stacks 53, then placing and assembling together the wall, door and window modules or panels, welding the rings 54 to the lower portion thereof, with the reinforcing rods 55 previously threaded therethrough, assembling the roof modules or panels, and after the whole structure has been properly assembled together by means of the assembling tongues or by means of welded joints between the different modules, a monolithic layer of concrete material is applied either by brushing or spraying technics on the surface of the metal screen or mesh, thereby providing a monolithic construction of a remarkably high resistance and stability, and having a great sound, heat and light insulating power because of the air chambers contained in the modules of the present invention.

Figures 12, 13:
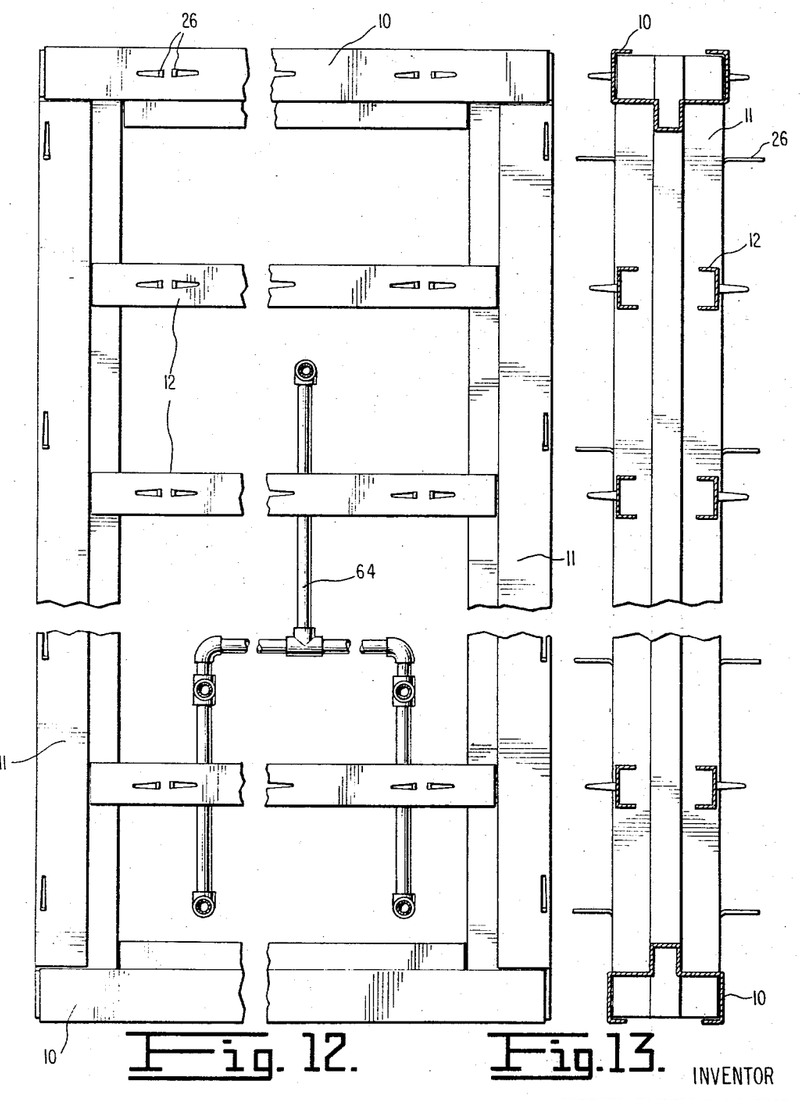
FIG. 12 is a fragmented elevational view of a wall module built in accordance with the present invention with the covering layers taken away in order to show inner details of the water, drainage, lighting or steam facilities incorporated therein in a completely concealed manner.
FIG. 13 is a fragmented side elevational view of the module of FIG. 12 showing the arrangement of the anchoring and assembling tongues according to one embodiment of the invention.

As an ancillary feature of the present invention, FIGS. 12 and 13 show that the modules of the present invention can be used to properly install piping 64 or other facilities for water, air, steam, lighting and electric services to be provided in the house of the present invention.

While the present invention has been described in connection with a preferred embodiment, it is to be understood that many changes and modifications will occur to those skilled in the art, such as the provision of welded joints and the like, and that all those changes and modifications falling within the scope of the following claims are to be considered as embraced by the true scope and spirit of the present invention.

Having thus described the invention, what I claim as new and desire to secure by Letters Patent is:

1. A building wall panel comprising in combination a rectangular frame, said frame comprising two longitudinal channel structural members and two transverse channel structural members, said channel structural members including end walls and side walls, assembling tabs at the ends of at least a pair of said members, said end walls having assembling slits adjacent the ends of at least said other pair of members, said tabs being engaged in said slits and folded over the other side of the end wall of said members, a plurality of transverse reinforcing members arranged at different heights of said frame, assembling tabs at the ends of said reinforcing members, intermediate slits in the end walls of said longitudinal frame members located at said different heights of said frame, said reinforcing member tabs being engaged in said intermediate slits and folded over the other side of the end wall of said longitudinal members, the edges of said reinforcing members being approximately flush with at least one of the side walls of said longitudinal members, a layer of water proofing sheet material on at least two faces of said frame, a layer of metallic mesh material on said layer of water proofing material, a plurality of pairs of integrally formed anchoring tongues on said transverse reinforcing members extending through said layers with the tongues of each pair locked together to hold said layers in position, and a plurality of integrally formed assembling tongues on said longitudinal and transverse frame members for locking engagement with corresponding pluralities of assembling tongues on adjacent panels to hold the edge of said layers in position.

2. A building wall panel as described in claim 1, wherein said transverse reinforcing members comprise a pair of struts.

3. A building wall panel comprising in combination a rectangular frame, said frame comprising two longitudinal structural members and two transverse structural members, said structural members having end walls and side walls, assembling tabs at the ends of at least a pair of said members, said end walls having assembling slits adjacent the ends of at least said other pair of members, said tabs being engaged in said slits and folded over the other side of the wall of said members, a transverse reinforcing lintel-forming member located at a predetermined height of said frame, at least the lower transverse frame member and the longitudinal frame members being provided with a door-accommodating shoulder, hinges on at least one of said longitudinal members, assembling tabs at the ends of said lintel-forming member, intermediate slits in the end walls of said longitudinal frame members located at said predetermined height of said frame, said tabs of the lintel-forming member being engaged in said intermediate slits and folded over the other side of the wall of said longitudinal members, the edges of said lintel-forming member being flush with both side walls of said longitudinal members, a layer of water proofing sheet material on the doorhead sections of the two faces of said frame, a layer of metallic mesh material on said layer of water proofing material, a plurality of pairs of integrally formed anchoring tongues on said lintel-forming member extending through said layers with the tongues of each pair locked together to hold said layers in position, a plurality of integrally formed assembling tongues on said longitudinal and transverse frame members for locking engagement with corresponding pluralities of assembling tongues on adjacent panels to hold the edges of said layers in position.

4. A building wall panel comprising in combination a rectangular frame, said frame comprising two longitudinal structural members and two transverse structural members, said structural members having end walls and side walls, assembling tabs at the ends of at least a pair of said members, said end walls having assembling slits adjacent the ends of at least said other pair of members, said tabs being engaged in said slits and folded over the other side of the end wall of said members, a plurality of transverse reinforcing members arranged at different heights of said frame, assembling tabs at the ends of said reinforcing members, intermediate slits in the end walls of said longitudinal frame members located at said different heights of said frame, said reinforcing member tabs being engaged in said intermediate slits and folded over the other side of the end wall of said longitudinal members, the edges of said reinforcing member being approximately flush with at least one of the side walls of said longitudinal members, at least a pair of said transverse reinforcing members being provided with longitudinal ridges to receive a winged window sash containing a window glass therein, means for attaching said window sash to said members, a layer of water proofing sheet material on at least two faces of said frame except on the section corresponding to said window sash, a layer of metallic mesh material on said layer of water proofing material, a plurality of pairs of integrally formed anchoring tongues on said transverse reinforcing members extending through said layers with the tongues of each pair locked together to hold said layers in position, and a plurality of integrally formed assembling tongues on said longitudinal and transverse frame members for locking engagement with corresponding pluralities of assembling tongues on adjacent panels to hold the edges of said layers in position.

5. A building roof panel comprising in combination a rectangular frame, said frame comprising two longitudinal tapered structural members and two transverse structural members, said structural members having end walls and side walls one of said transverse members being narrower than the other to accommodate the taper of said longitudinal members, assembling tabs at the ends of at least a pair of said members, said end walls having assembling slits adjacent the ends of at least said other pair of members, said tabs being engaged in said slits and folded over the other side of the end wall of said members, a plurality of transverse reinforcing members arranged at different positions intermediate said transverse frame members, assembling tabs at the ends of said reinforcing members, intermediate slits in the end walls of said longitudinal tapered frame members located at said different positions of said frame, said reinforcing member tabs being engaged in said intermediate slits and folded over the other side of the end wall of said longitudinal members, the edges of said reinforcing members being approximately flush with at least one of the side walls of said longitudinal members, a layer of water proofing sheet material on at least two faces of said frame, a layer of metallic mesh material on said layer of water proofing material, a plurality of pairs of integrally formed anchoring tongues on said transverse reinforcing members extending through said layers with the tongues of each pair locked together to hold said layers in position, a plurality of integrally formed assembling tongues on said longitudinal and transverse frame members for locking engagement with corresponding pluralities of assembling tongues on adjacent panels to hold the edges of said layers in position, and a plurality of reinforcing metal rods extending crosswisely to said frame and laying on said layer of metallic mesh material, at least some of said assembling tongues clamping said reinforcing rods to hold them in position.

6. A prefabricated building comprising in combination a plurality of building panels, said building panels each comprising a rectangular frame, said frame having side walls, a plurality of transverse reinforcing members attached to at least a pair of members of said frame, the edges of said transverse members being approximately flush with one of the side walls of said frame, another plurality of transverse reinforcing members attached to at least said pair of members of said frame, the edges of said other transverse members being approximately flush with the other side walls of said frame, a layer of water proofing sheet material on at least two faces of said frame, a layer of metal open mesh material on said layer of water proofing material, means for fastening said layers of water proofing material and metal open mesh material, and means at the edges of each frame to attach said panel to at least another adjacent panel, at least one of said building panels comprising a rectangular opening to accommodate a door, at least some others of said building panels each comprising a rectangular opening to accommodate a window sash, and at least some others of said building panels comprising tapered longitudinal frame members and being arranged in a horizontal array to form the roof of the building, a plurality of reinforcing metal rods fastened to said tapered frame members to serve as reinforcing rods for a roof slab, a monolithic layer of concrete material on all of said building panels, a layer of surfacing material on at least a portion of said panels, and a foundation formed by a plurality of brick stacks, a plurality of metal rings welded to the lower portion of at least a part of said building panels, a pair of continuously extending horizontal metal rods engaging to said metal rings, and a cast concrete floor slab embedding said brick stacks, said metal rings and said continuous reinforcing horizontal metal rods.

7. A prefabricated building according to claim 6, wherein said brick stacks are located at the joints between pairs of adjacent wall panels and said metal rings are located intermediate thereof.

8. A prefabricated building according to claim 7, wherein said metal rings are of trapezoidal shape.

References Cited

UNITED STATES PATENTS

| | | | |
|---|---|---|---|
| 2,391,960 | 1/1946 | Gede | 52—234 X |
| 3,073,066 | 1/1963 | Edwards | 52—363 X |

JOHN E. MURTAGH, *Primary Examiner.*

G. W. HORNADAY, *Assistant Examiner.*